United States Patent
Anderson et al.

(10) Patent No.: US 10,397,734 B2
(45) Date of Patent: Aug. 27, 2019

(54) SYSTEM AND METHODOLOGY FOR ACTIVATING GEOFENCE FROM SELECTION LIST

(71) Applicant: International Business Machines Corporation, Armonk, NY (US)

(72) Inventors: Evelyn R. Anderson, Houston, TX (US); Michael Bender, New York, NY (US); Rhonda L. Childress, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 50 days.

(21) Appl. No.: 15/349,251

(22) Filed: Nov. 11, 2016

(65) Prior Publication Data

US 2018/0139573 A1    May 17, 2018

(51) Int. Cl.
*H04W 4/021*    (2018.01)
*H04W 4/02*    (2018.01)

(52) U.S. Cl.
CPC .......... *H04W 4/021* (2013.01); *H04W 4/025* (2013.01)

(58) Field of Classification Search
None
See application file for complete search history.

(56) References Cited

U.S. PATENT DOCUMENTS

| | | | |
|---|---|---|---|
| 6,721,652 B1 | 4/2004 | Sanqunetti | |
| 7,286,929 B2 | 10/2007 | Staton et al. | |
| 8,686,841 B2 | 4/2014 | Macheca et al. | |
| 2007/0185728 A1* | 8/2007 | Schwarz | G06Q 10/06 701/36 |
| 2008/0125965 A1 | 5/2008 | Carani et al. | |
| 2009/0140886 A1 | 6/2009 | Bender | |
| 2011/0060808 A1* | 3/2011 | Martin | G06F 17/3087 709/217 |
| 2011/0121964 A1 | 5/2011 | Bannard | |
| 2013/0031047 A1* | 1/2013 | Boazi | G06F 17/30035 707/609 |
| 2013/0225196 A1 | 8/2013 | James et al. | |
| 2014/0122396 A1* | 5/2014 | Swaminathan | G06N 20/00 706/14 |
| 2014/0155094 A1* | 6/2014 | Zises | H04W 4/021 455/456.3 |

(Continued)

OTHER PUBLICATIONS

Mell P., et al., "The NIST Definition of Cloud Computing", NIST Special Publication 800-145, National Institute of Standards and Technology, U.S. Department of Commerce, pp. 1-7 (Sep. 2011).

*Primary Examiner* — German Viana Di Prisco
(74) *Attorney, Agent, or Firm* — Scully, Scott, Murphy & Presser, P.C.; Brian M. Restauro, Esq.

(57) ABSTRACT

The disclosure is directed to methods and systems for activating a geofence. These methods and systems include storing a plurality of pre-defined geofences in a database, storing a plurality of geofence activation rules in a database, each activation rule being based on data obtained from at least one member selected from the group consisting of analytics data, calendaring data and on-demand data, enable a geofence activation rule, selecting at least one pre-defined geofence based on the enabled geofence activation rule and activating and deactivating the at least one selected pre-defined geofence based on the enabled a geofence activation rule.

18 Claims, 5 Drawing Sheets

(56) References Cited

U.S. PATENT DOCUMENTS

| | | | | |
|---|---|---|---|---|
| 2014/0162692 A1* | 6/2014 | Li | ............................ | H04L 67/40 |
| | | | | 455/456.3 |
| 2014/0171099 A1* | 6/2014 | Sydir | .................... | H04W 4/043 |
| | | | | 455/456.1 |
| 2015/0095355 A1 | 4/2015 | Patton | | |
| 2015/0148061 A1* | 5/2015 | Koukoumidis | ....... | H04W 4/022 |
| | | | | 455/456.1 |
| 2015/0163629 A1* | 6/2015 | Cheung | ................. | H04W 4/021 |
| | | | | 455/456.1 |
| 2015/0258961 A1* | 9/2015 | Doherty | ................ | B60R 25/042 |
| | | | | 701/2 |
| 2016/0094944 A1 | 3/2016 | Kong et al. | | |

\* cited by examiner

SYSTEM AND METHODOLOGY FOR ACTIVATING GEOFENCE FROM SELECTION LIST

FIELD

The present application relates generally to computers, and computer applications, and more particularly to computer-implemented methods to activate one or more geofences from a list of geofences.

BACKGROUND

A geofence is a virtual perimeter or a virtual boundary for a geographic area. A geofence is commonly used with a location-aware device (e.g., a mobile device or a wearable computing device) that is using a location-based service (LBS) such as a global positioning system (GPS) to determine if a user is entering or exiting a geofenced area. When a user carrying a location aware device crosses a geofence boundary, an alert and/or notification may be sent to the location aware device (e.g., a mobile device or a wearable computing device) user as well as generating a message to the geofence operator who sets up and/or maintains the geofence.

Known methods and systems that utilize geofences can create and monitor them according to input from a user but cannot select what geofence should be used based on a specified schedule.

BRIEF SUMMARY

One embodiment of a computer implemented method for activating geofences includes the steps of storing a plurality of pre-defined geofences in a database, storing a plurality of geofence activation rules in a database, each activation rule being based on data obtained from at least one member selected from the group consisting of analytics data, calendaring data and on-demand data, enable a geofence activation rule, selecting at least one pre-defined geofence based on the enabled geofence activation rule and activating and deactivating the at least one selected pre-defined geofence based on the enabled a geofence activation rule.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Embodiments of the present invention recognize that typically, a geofence is generated by a radius around a point location or a target area such as a store, generated as pre-determined distance from a road, or as a geofence boundary on a map such as a park boundary determined using map coordinates or geographic coordinates.

Figure 1:
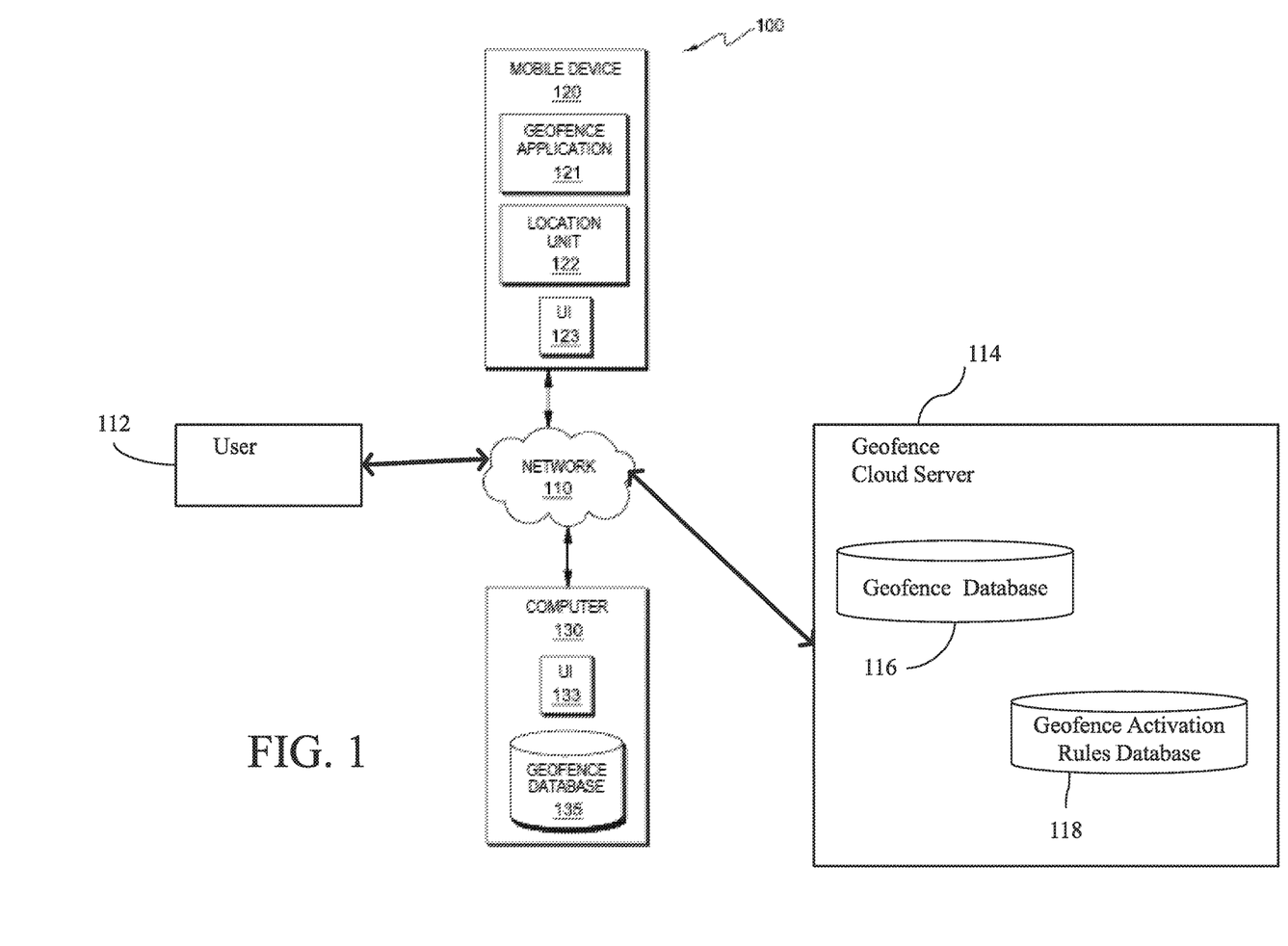
FIG. 1 is a block diagram illustrating a distributed data processing environment, in accordance with at least one embodiment of the present invention.

FIG. 1 is a functional block diagram illustrating a distributed data processing environment, generally designated 100, in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted, distributed data processing environment 100 includes mobile device 120, computer 130, a user 112 and a geofence server 114 interconnected over network 110. Network 110 can include, for example, a telecommunications network, a local area network (LAN), a virtual LAN (VLAN), a wide area network (WAN), such as the Internet, or a combination of the these and can include wired or wireless connections. Network 110 can include one or more wired and/or wireless networks that are capable of receiving and transmitting data including receiving signals such as radio waves and location information such as a global positioning system (GPS) location from global positioning system or an indoor location from an indoor location system that may be used for creating a geofence. In general, network 110 can be any combination of connections and protocols that will support communications between mobile device 120 and computer 130 and other computing devices (not shown) within distributed data processing environment 100.

Examples of mobile device 120 include a smart phone, a wearable computer such as a smart watch or a FitBit®, a hand held device such as a tablet, a personal digital assistant (PDA), a notebook computer or any other movable computing device capable of providing location data or connecting to a GPS or other location determination system via network 110. In various embodiments, mobile device 120 is a mobile computing device such as a smart phone with location determination capability. Mobile device 120 may receive and send data such as a location or a GPS position to computer 130 and other computing devices (not shown) in distributed data processing environment 100. As depicted, mobile device 120 includes geofence application 121, location unit 122 and optional user interface (UI) 123. Mobile device 120 using location unit 122 may continuously or intermittently determine a user's location and receive or send information (e.g., GPS coordinates or indoor location coordinates) to computer 130. Mobile device 120 may send geofence data such as determined locations for a geofence boundary to geofence database 135 on computer 130.

Geofence application 121 determines a geofence boundary for a desired geofenced area. Geofence application 121 provides a capability to create a geofence. A geofence for a desired geofenced area may be determined by geofence application 121 as the user of mobile device 120 walks, drives or otherwise moves along a desired geofence boundary. The desired geofenced area for a geofence created by geofence application 121 may be an irregularly shaped area or a polygon-shaped area for any shape geofenced area. The geofence boundary for a geofence created by geofence application 121 can be based on intermittently or continuously received location data such as GPS locations for a geofence boundary. Geofence application 121 identifies the geofence boundary using data or locations determined by geofence application 121 using location unit 122 as a user of mobile device 120 moves along a perimeter of the desired geofence boundary.

While geofence application 121 creates irregularly shaped geofences, in an embodiment, geofence application 121 creates a geofence with a shape that includes one or more polygon or known geometric shapes. For example, geofence application 121 may create an oval shaped geofence, a square shaped geofence, or a geofence that is a partial or whole perimeter along an irregular shape such as a stream.

Geofence application 121 may send the data for a geofence to geofence database 135 on computer 13 and/or may store the geofence data locally in persistent storage or in a database on mobile device 120. In various embodiments, geofence application 121 creates and maintains operation of the geofence. In an embodiment, computer 130 maintains the created geofence (e.g., tracks entries/exits and/or sends alerts). While depicted on mobile device 120 in FIG. 1, in some embodiments, geofence application 121 resides on computer 130. Geofence application 121 sends and receives data from location unit 122 and geofence database 135 via network 110.

Location unit 122 is a location determination device or application providing mobile device 120 with the capability to determine a current location for mobile device 120. In various embodiments, location unit 122 may include a GPS receiver and may determine a location of mobile device 120 based on one or more signals received from GPS satellites. In other embodiments, location unit 122 uses another location determination technology. For example, location unit 122 uses a system such as an RF identification (RFID) system, a real-time locating system, an indoor positioning system, an optical positioning system, a hybrid positioning system using more than one positioning technologies (e.g., GPS and Wi Fi positioning data) to determine a location or other known location determination method. In some embodiments, location unit 122 is a handheld or wearable location determination device (not included in mobile device 120) such as an RF tag that sends location tracking data to geofence application 121 as a user carrying the RF tag travels among one or more geofences.

Optional UT 123 on mobile device 120 is a user interface providing an interface between a user and computer 130, and enables a user of mobile device 12 to interact with programs and data on mobile device 120, computer 130 and other computing devices (not shown in FIG. 1). UT 123 may be any known user interface such as a graphical user interface (GUI), an active area or line for text inputs, a web user interface (WUI), or other type of user interface and can display text, documents, user options, application interfaces, and instructions for operation such as commands, and include the information that a program presents to a user. In an embodiment, UI 123 receives a user input via a touch screen, a keyboard, a mouse, a display, an audio or voice, a visual or motion sensing device or other peripheral device used with computer devices. In another embodiment, mobile device 120 does not include a UI, such as, for example, a FitBit® or other wearable location tracker, which does not have a UI but still could operate as mobile device 120 does by including geofence application 121 and location unit 122.

Computer 130 can be a desktop computer, a notebook, a tablet, a mobile computing device, a web server, a management server or any other electronic device or known computing device capable of receiving, sending and processing data. Computer 130 can be a laptop computer, a computing device used in a server system, or any programmable electronic device capable of communicating with mobile device 120 and other electronic devices in distributed data processing environment 100 via network 110. In various embodiments, computer 130 is a shared pool of configurable computing resources (e.g., networks, servers, storage, applications, and services) that act as a single pool of seamless resources when accessed such as used in a cloud-computing environment.

Computer 130 includes UI 133 and geofence database 135. UI 133 on computer 130 is any known user interface providing an interface between a user and computer 130, and enables a user of computer 130 to interact with programs and data on mobile device 120, computer 130 and other computing devices (not shown in FIG. 1). Computer 130 can receive and send data such as a mobile device location and geofence data from mobile device 120. Computer 130 may store geofence data such as geofence boundary locations for a geofence in geofence database 135. While depicted on computer 130, geofence database 135 may reside in one or more other computers (not shown in FIG. 1).

The user 112 can receive and transmit data with the network 110 to enable various geofence activation rules, and for selecting at least one pre-defined geofence based on the enabled geofence activation rule, which are discussed in reference to FIG. 2 below.

The network 110 also receives and transmits data with the geofence server 114. Geofence server 114 is a hardware computer that is accessible either directly or remotely through network 110 and can be any electronic device or known computing device capable of receiving, sending, storing and processing data. In another embodiment, geofence server 114 is implemented as a cloud service comprised of a shared pool of configurable computing resources (e.g., networks, servers, storage, applications, and services) that acts as a single pool of seamless resources when accessed by the network 110.

Geofence server 114 contains a geofence database 116 and a list of one or more geofence activation rules in geofence activation rule database 118. Geoknce database 116 is a database with one or more geofences saved within it. Geofence database 116 can receive each of the one or more saved geofences in one of three ways: the first way is through input by the user 112 through network 110; the second way is through receipt of an instruction so that geofence database 116 retrieves each of the one or more saved geofences by accessing the geofence database 135 through network 110; and the third way is that geofence server 114 can be programmed to automatically instruct geofence database 116 to retrieve each of the one or more saved geofences by accessing the geofence database 135 through network 110.

When geofence database 116 receives one or more saved geofences through input by the user 112, the user 112 can select a predetermined geofence stored in geofence database 135 or the user 112 can design the borders of a new geofence.

The geofence activation rules database 118 stores one or more rules for which one or more geofences should be activated at any particular time. These one or more rules are based on data stored in the geofence activation rules database 118, and are obtained from at least one member of data selected from the group consisting of analytics data, calendaring data and on-demand data. Each of the rules stored in the geofence activation rules database 118 is assigned to one or more specific geofences stored in geofence database 116 and/or in geofence database 135.

Analytics data stored in the geofence activation rules database 118 includes historical information corresponding to prior geofence activation by the user 112, or prior geofence activation by other users. For example, if the user 112 activates one or more geofences several Mondays at 8 am, the geofence activation rules database 118 can create and store an activation rule for Monday at 8 am.

Calendaring data stored in the geofence activation rules database 118 includes data from at least one member selected from the group consisting of one or more calendar schedules, time ranges, dates and date ranges. Calendaring data can be input by the user 112 into the geofence activation rules database 118. For example, the user 112 can input a calendar schedule to activate one or more geofences over a particular time range every week, every month, etc., to activate one or more geofences for a particular time range, to activate one or more geofences for a particular date and to activate one or more geofences for a particular date range.

The analytics data can also include analyzing calendaring data trends and modifying one or more activation rules based on the calendaring data trends. For example, if the calendar schedules are changed by the user 112 two or more times, the geofence activation rules database 118 can modify that calendar schedule so the user 112 does not have to continue making those changes.

On-demand data stored in the geofence activation rules database 118 includes data that is requested by the user 112 for a specific geofence. For example, if the user 112 wants to create a geofence in an area that has not been previously indicated for activation by the user 112, the user 112 can activate a different geofence stored in the geofence database 116 for a specified time. Also, if the user 112 wants to create a geofence in an area that has not been previously indicated for activation by the user 112, the user 112 can identify the geofence on their mobile device 120, which can access the geofence database 135 and cause the selected geofence to be uploaded through network 110 to geofence database 116.

Each of the above discussed activation rules, based on analytics data, based on calendaring data and based on on-demand data can further be based on at least one of location data of the user 112, or another mobile device identified by the user, and proximity between the user 112 and another mobile device identified by the user. For example, an activation rule based on analytics data can be based on location of the user 112-if the user 112 moves to a location every Thursday at 5 pm, prior geofences that have been activated in this situation can again be activated by geofence activation rules database 118. As another example, an activation rule based on analytics data can be based on proximity between the user 112 and another mobile device identified by the user 112-if the user 112 moves to a location within 100 yards of a spouse's mobile device, a geofence can be activated for an area within 100 yards (or another distance) of the other mobile device. In this example, if the user goes beyond the distance limitation of the activated geofence the geofence activation rules database 118 can deactivate the proximity geofence, and/or cause an alert/notification to be sent to another device.

Figure 2:
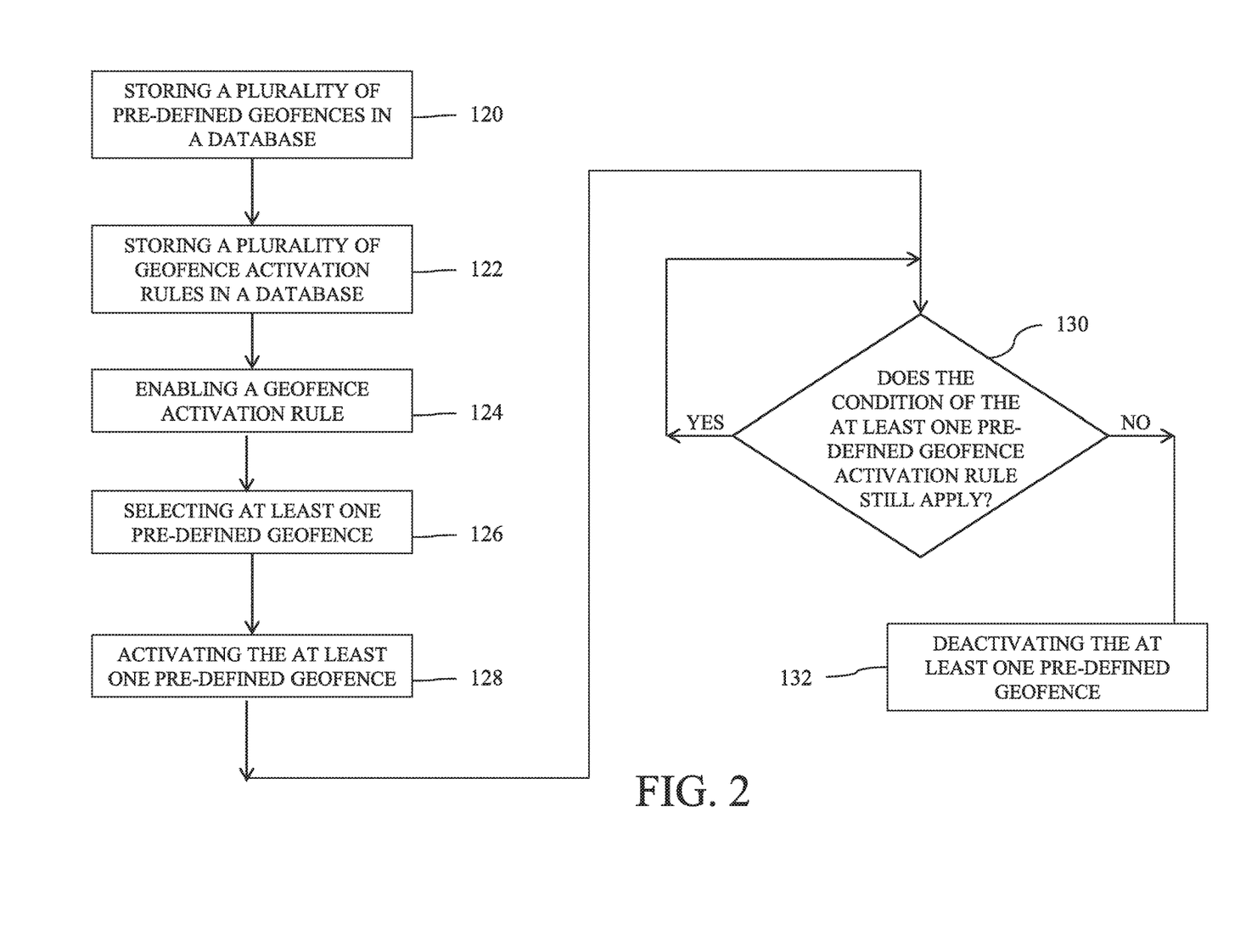
FIG. 2 is a flow diagram illustrating a method of activating a geofence according to an embodiment of the present invention.

FIG. 2 is a flow diagram illustrating a method for activating a geofence through interaction of components including the user 112, the network 110 and the geofence server 114.

Initially, in step 120 a plurality of pre-defined geofences are stored in geofence database 116. Then a plurality of geofence activation rules are stored in geofence activation rules database 118, in step 122.

Next, one of the plurality of geofence activation rules stored in the geofence activation rules database 118 is enabled in step 124. The rules enabled in step 124 can be one or more rule that is based on data obtained from at least one of analytics data, calendaring data and an on-demand data.

Next, at least one pre-defined geofence is selected, from the geofence database 116, based on the enabled geofence activation rule in the geofence database 116 in step 126. After selection, the selected at least one pre-defined geofence is activated in step 128.

After activation of the at least one pre-defined geofence, the geofence activation rules database 118 can determine if the condition of the at least pre-defined geofence activation rule still applies in step 130. For example, if the at least one pre-defined geofence is based on calendaring data, from 9 am to 5 pm on Monday, the geofence activation rules database 118, after activation at 9 am, determines if the current time is before or after 5 pm.

If the answer in step 130 is yes, the geofence activation rules database 118 loops back and the again determines if the condition of the at least one pre-defined geofence activation rule still applies. If the answer in step 130 is no, the geofence activation rules database 118 deactivates the at least one pre-defined geofence in step 132.

One example of the above method is discussed below, for exemplary purposes.

Initially, in step 120 a plurality of pre-defined geofences, including one for a school, are stored in geofence database 116. Then a plurality of geofence activation rules, including a school calendar data geofence activation rule, are stored in geofence activation rules database 118, in step 122. Both of these steps can be taken by a user 112, which can be a parent of a child attending the school.

Then, in step 124 the specific calendar data geofence activation rule is enabled, which is for 8 AM-3 PM Monday through Friday, excluding Saturdays and Sundays and excluding school holidays such as Thanksgiving. In step 126 the school geofence stored in the geofence database 116 is selected. Geofence activation rules database 118 can also reference a school district's calendar to determine various holidays and school closing times so as to not activate a school geofence on that day. Geofence activation rules database 118 can also reference a separately stored calendar, such as a parent's calendar, to determine other instances of not activating the school geofence, such as the child going to a doctor's appointment.

In step 128 the geofence activation rules database 118 activates the school database for 8 AM-3 PM Monday through Friday, excluding Saturdays and Sundays and excluding school holidays. For example, on a Monday at 8 AM the school geofence is activated and the geofence activation rules database 118 continues to check during the day if the current time is between 8 AM and 3 PM. If the current time is between 8 AM: and 3 PM on the Monday, the school geofence remains activated. Once the geofence activation rules database 118 checks the current time that is after 3 PM on the Monday, the geofence activation rules database 118 deactivates the school geofence in step 132.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 3:
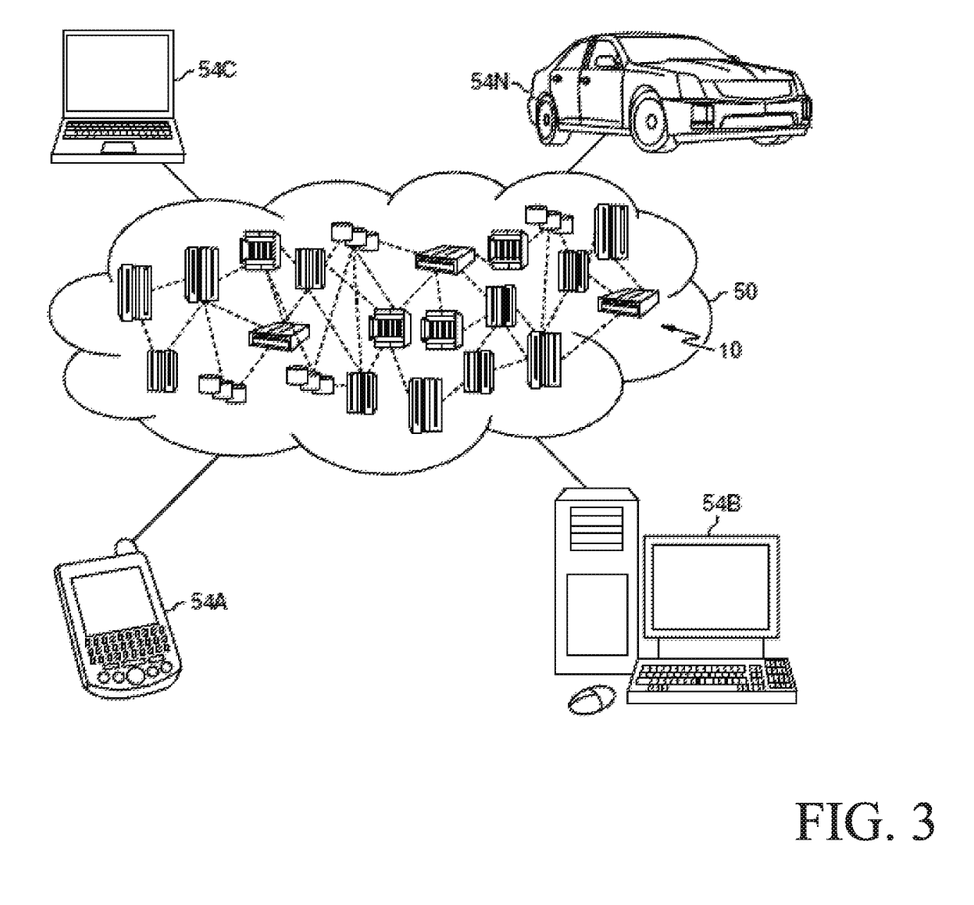
FIG. 3 depicts a cloud computing environment according to an embodiment of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
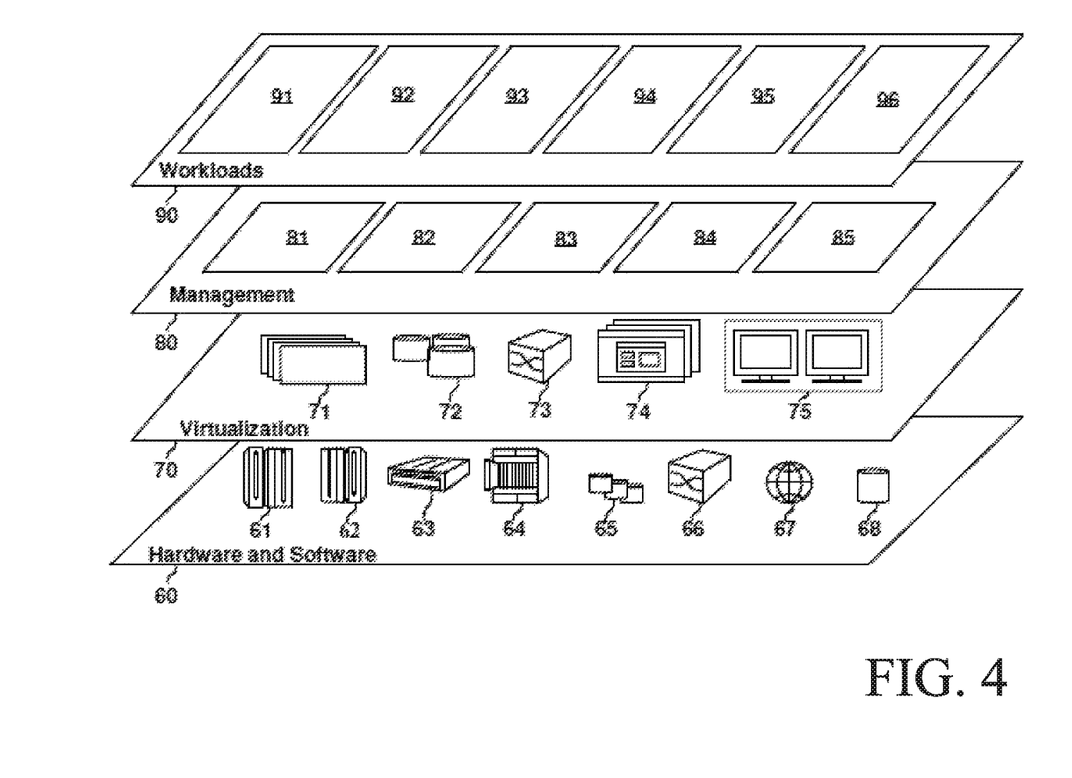
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and activating geofences 96.

Figure 5:
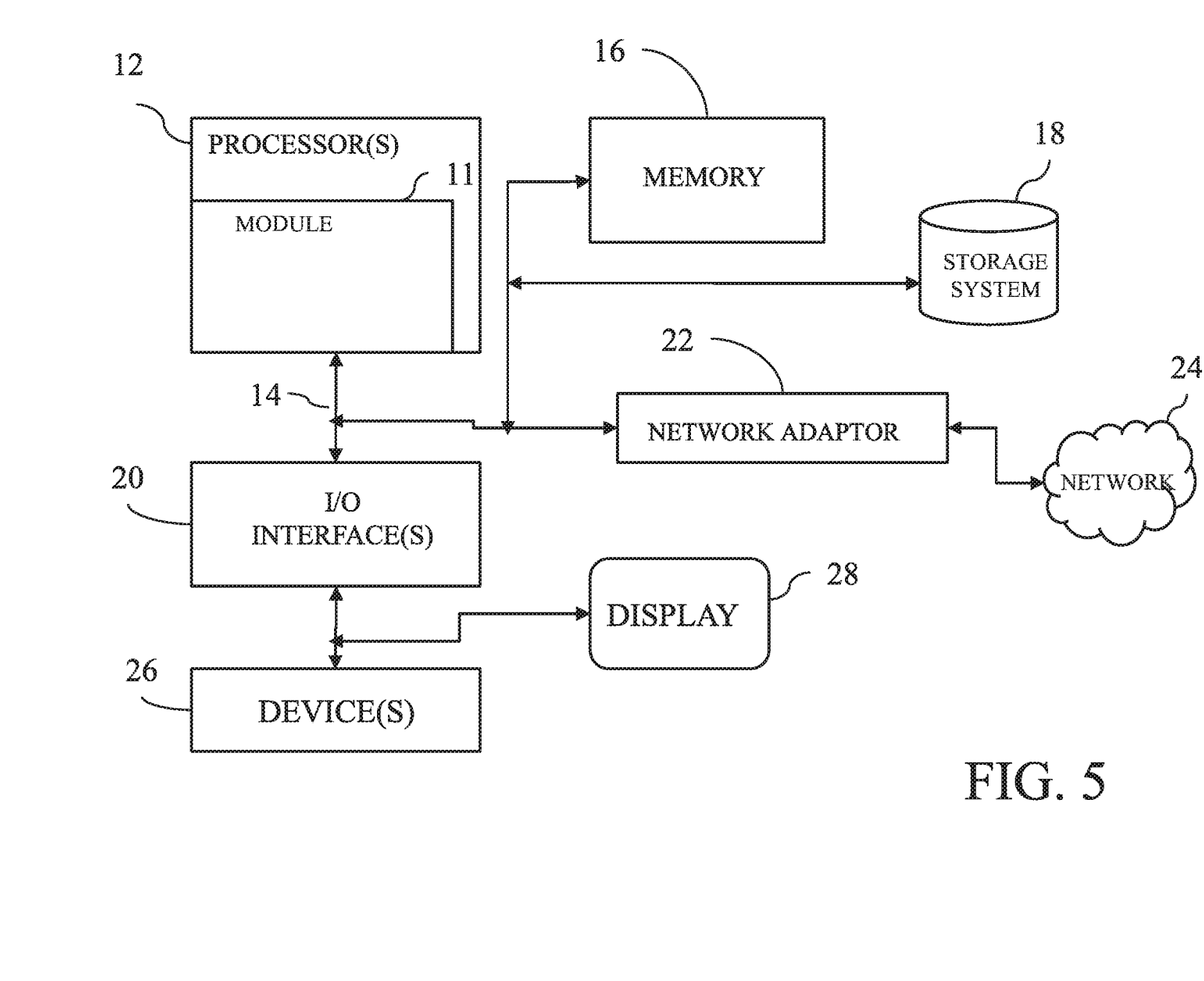
FIG. 5 illustrates a schematic of an example computer or processing system according to an embodiment of the present invention.

FIG. 5 illustrates a schematic of an example computer or processing system according to an embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 11 that performs the methods described herein. The module 11 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive") Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (110) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for activating a geofence comprising:
   storing a plurality of pre-defined geofences in a database;
   storing a plurality of geofence activation rules in a database, each activation rule being based on data obtained from calendaring data and analytics data;
   enabling a geofence activation rule;
   selecting at least one pre-defined geofence based on the enabled geofence activation rule;
   activating and deactivating the at least one selected pre-defined geofence based on the enabled geofence activation rule; and
   providing a notification to a device upon deactivation of the at least one selected pre-defined geofence, wherein the calendaring data includes data from one or more calendar schedules and at least one member selected from the group consisting of, time ranges, dates and date ranges, wherein the analytics data includes analyzing calendaring data trends, and the geofence activation rules database automatically modifies one or more activation rules based on the calendaring data trends, and wherein the one or more calendar schedules are automatically changed by the geofence activation rules database based on calendar schedule changes received from a user.

2. The computer implemented method of claim 1, wherein the analytics data includes historical information corresponding to prior geofence activation.

3. The computer implemented method of claim 1, further comprising basing each activation rule on data obtained from on-demand data.

4. The computer implemented method of claim 3, wherein the on-demand data includes a request for a specific pre-defined geofence.

5. The computer implemented method of claim 4, wherein the on-demand data includes information identifying a geofence and uploading the identified geofence into the database.

6. The computer implemented method of claim 1, wherein one or more of the activation rules are also based on proximity to a user of a second device.

7. The computer implemented method of claim 1, wherein software is provided as a service on a cloud environment.

8. A system for activating a geofence, comprising:
   one or more storage devices;
   one or more hardware processors coupled to the one or more storage devices;
   one or more hardware processors operable to store a plurality of pre-defined geofences in a database;
   one or more hardware processors operable to store a plurality of geofence activation rules in a database, each activation rule being based on data obtained from calendaring data and analytics data;
   one or more hardware processors operable to enable a geofence activation rule;
   one or more hardware processors operable to select at least one pre-defined geofence based on the enabled geofence activation rule;
   one or more hardware processors operable to activate and deactivate the at least one selected pre-defined geofence based on the enabled geofence activation rule; and
   one or more hardware processors operable to provide a notification to a device upon deactivation of the at least one selected pre-defined geofence, wherein the calendaring data includes data from one or more calendar schedules and at least one member selected from the group consisting of, time ranges, dates and date ranges, wherein the analytics data includes analyzing calendaring data trends, and the geofence activation rules database automatically modifies one or more activation rules based on the calendaring data trends, and wherein the one or more calendar schedules are automatically changed by the geofence activation rules database based on calendar schedule changes received from a user.

9. The system of claim 8, wherein the analytics data includes historical information corresponding to prior geofence activation.

10. The system of claim 8, further comprising basing each activation rule on data obtained from on-demand data.

11. The system of claim 10, wherein the on-demand data includes a request for a specific pre-defined geofence.

12. The system of claim 11, wherein the on-demand data includes information identifying a geofence and uploading the identified geofence into the database.

13. The system of claim 8, wherein one or more of the activation rules are also based on proximity to a user of a second device.

14. A computer readable storage medium storing a program of instructions executable by a machine to perform a method of activating a geofence, the method comprising:
   storing a plurality of pre-defined geofences in a database;
   storing a plurality of geofence activation rules in a database, each activation rule being based on data obtained from calendaring data and analytics data;
   enabling a geofence activation rule;
   selecting at least one pre-defined geofence based on the enabled geofence activation rule;
   activating and deactivating the at least one selected pre-defined geofence based on the enabled geofence activation rule; and
   providing a notification to a device upon deactivation of the at least one selected pre-defined geofence, wherein the calendaring data includes data from one or more calendar schedules and at least one member selected from the group consisting of, time ranges, dates and date ranges, wherein the analytics data includes analyzing calendaring data trends, and the geofence activation rules database automatically modifies one or more activation rules based on the calendaring data trends, and wherein the one or more calendar schedules are automatically changed by the geofence activation rules database based on calendar schedule changes received from a user.

15. The computer readable storage medium of claim 14, wherein the analytics data includes historical information corresponding to prior geofence activation.

16. The computer readable storage medium of claim 14, wherein one or more of the activation rules are also based on proximity to a user of a second device.

17. The computer readable storage medium of claim 14, further comprising basing each activation rule on data obtained from on-demand data.

18. The computer readable storage medium of claim 17, wherein the on-demand data includes a request for a specific pre-defined geofence.

* * * * *